US009103410B2

(12) United States Patent
Ullein et al.

(10) Patent No.: US 9,103,410 B2
(45) Date of Patent: Aug. 11, 2015

(54) PREASSEMBLED TRACTION MECHANISM DRIVE

(75) Inventors: Thomas Ullein, Frensdorf (DE); Racine Thiam, Erlangen (DE); Mona Huss, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 716 days.

(21) Appl. No.: 13/397,992

(22) Filed: Feb. 16, 2012

(65) Prior Publication Data

US 2013/0009457 A1 Jan. 10, 2013

(30) Foreign Application Priority Data

Jul. 4, 2011 (DE) .................. 10 2011 078 587

(51) Int. Cl.
*B62D 55/30* (2006.01)
*F16H 7/00* (2006.01)
*F16H 7/08* (2006.01)
*F16H 57/00* (2012.01)

(52) U.S. Cl.
CPC .. *F16H 7/00* (2013.01); *F16H 7/08* (2013.01); *F16H 2057/005* (2013.01)

(58) Field of Classification Search
CPC ......... B62D 55/12; B62D 55/30; B62D 55/32
USPC .......... 305/124, 125, 127, 143, 155, 60, 126, 305/133, 134, 135, 139, 141; 474/139, 110, 474/111; 180/9.1, 9.52; 29/893.1, 893.2
See application file for complete search history.

(56) References Cited

U.S. PATENT DOCUMENTS

| | | | | |
|---|---|---|---|---|
| 1,480,693 A | * | 1/1924 | Rackham et al. | 305/44 |
| 1,579,245 A | * | 4/1926 | Pennington | 305/134 |
| 2,389,028 A | * | 11/1945 | Cost | 305/133 |
| 2,426,816 A | * | 9/1947 | Busque | 180/9.62 |
| 2,859,045 A | * | 11/1958 | Beaufort et al. | 280/43 |
| 3,722,962 A | * | 3/1973 | Cooper | 305/180 |
| 3,841,424 A | * | 10/1974 | Purcell et al. | 180/9.5 |
| 4,448,273 A | * | 5/1984 | Barbieri | 180/9.21 |
| 7,690,738 B2 | * | 4/2010 | Wilt | 305/133 |
| 8,783,795 B2 | * | 7/2014 | Brazier | 305/130 |
| 2008/0211299 A1 | * | 9/2008 | Wilt | 305/131 |

FOREIGN PATENT DOCUMENTS

DE  102008020743  4/2009

* cited by examiner

*Primary Examiner* — S. Joseph Morano
*Assistant Examiner* — Jean Charleston
(74) *Attorney, Agent, or Firm* — Volpe and Koenig, P.C.

(57) ABSTRACT

A preassembled traction mechanism drive having at least two drive wheels (1, 2) around which an endless traction mechanism (3) is wrapped, and a tensioning device (6) that has a housing (4) and is supported on the internal side of the endless traction mechanism (3). In the housing (4), at least two fixation elements (5) are provided that are fixedly connected to the housing (4) and that fix the drive wheels (1, 2), around which the endless traction mechanism (3) is wrapped, at an operational distance from one another.

10 Claims, 1 Drawing Sheet

PREASSEMBLED TRACTION MECHANISM DRIVE

CROSS-REFERENCE TO RELATED APPLICATIONS

This application claims the benefit of German Patent Application No. 102011078587.6, filed Jul. 4, 2011, which is incorporated herein by reference as if fully set forth.

FIELD OF THE INVENTION

The present invention relates to a preassembled traction mechanism drive for tensioning an endless traction mechanism.

BACKGROUND

Traction mechanism drives, such as endless belt or chain drives, are used for example in internal combustion engines of motor vehicles to transmit the rotational movement of the crankshaft to the camshafts or balancer shafts, or to drive various aggregates such as the water pump, air conditioning compressor, starter generator, etc. In order to ensure that the rotational movement is transmitted permanently and with as little slippage as possible, it is necessary to tension the traction mechanism during operation using a tensioning device.

In order to simplify the individual assembly, known in the earlier related art, of the individual parts of the traction mechanism drive on the internal combustion engine, in DE 10 2008 020 743 A1 a support unit is proposed on which the traction mechanism drive is situated with the individual parts pre-positioned in a manner that facilitates assembly. The traction mechanism drive situated on the support unit includes the traction mechanism itself, the chain wheels required for the transmission of the rotational movement, and a tensioning device that tensions the traction mechanism. The assembly of the traction mechanism drive is simplified using the proposed support unit in that, in a first step, all parts of the traction mechanism drive can be brought to the assembly location so as to be pre-positioned relative to one another via the support unit, in a second step the parts that are to be fastened to the internal combustion engine are fastened, and subsequently the traction mechanism can be pulled off of the support unit and pushed onto the parts fastened to the internal combustion engine. The support unit is then removed, which first requires the release of locking devices between the components for this purpose, so that the support unit can subsequently be removed using a tilting movement. Here, the support unit acts, in practical terms, as an aid to assembly by which the parts of the traction mechanism drive can be pre-positioned at the location of assembly in a position that is advantageous for handling during assembly.

In the prior art, solutions are known for preassembled traction mechanism drives, but these are often expensive both in preassembly and in installation.

SUMMARY

Therefore, the object of the present invention is to create a preassembled traction mechanism drive that can be preassembled and installed in a particularly simple fashion.

This object is achieved by a traction mechanism drive having the features of the present invention. Further preferred embodiments of the present invention are indicated in the drawings, the claims, and the associated description.

In order to achieve the object, according to the present invention a preassembled traction mechanism drive is proposed having at least two drive wheels about which there is wrapped an endless traction mechanism, a tensioning device supported on the inner side of the endless traction mechanism, and having a housing, at least two fixation elements being provided on the housing that are fixedly connected to the housing and that fix the drive wheels, around which the endless traction mechanism is wrapped, at a distance from one another ready for operation. Due to the fixation elements of the housing, the drive wheels can be transported in a preassembled state, ready for operation and ready for installation. Because the fixation elements are fixedly connected to the housing, an expensive preassembly is not required, and during installation it is not necessary to remove any additional component.

The installation of the preassembled traction mechanism drive can be further simplified on the basis of the advantageous embodiment described below.

Preferably, the fixation elements are situated on the housing in such a way that an axial displacement of the housing during the installation of the tensioning device results in release of the fixed drive wheels. In addition, the fixation elements are preferably situated on the housing such that during the installation of the tensioning device the fixation elements are moved out of the plane spanned by the fixed drive wheels, and thus release the drive wheels. Here it is advantageous if the (preferably axial) release movement of the housing with fixation elements that releases the fixation of the drive wheels is included in the movement that the tensioning device executes during installation. These advantageous embodiments have the result that it is not only possible to do completely without additional components, but in addition the release movement required to release the fixing is automatically executed during installation of the tensioning device. It can thus be excluded that the fixing is not released during installation, as was possible for example in the solution known from the prior art if the corresponding components were inadvertently not removed. The person performing the assembly also does not have to have any particular expert knowledge with regard to the preassembled traction mechanism drive, because for example a simple tightening of the screwed connection of the tensioning device already causes the fixing of the drive wheels to be released. Thus, the two previously required steps, namely the installation and the release of the fixation component, are combined in one step that always has to be carried out in any case.

Preferably, the tensioning device is situated between the drive wheels, and at least two of the drive wheels are fixed to one another by simultaneous contact with the housing of the tensioning device. In addition, the endless traction mechanism is preferably pre-tensioned by the tensioning device, and the drive wheels are preferably tensioned against the tensioning device by the tension force acting in the endless traction mechanism. Such a system is advantageous because in this way the components can be compressed into a small space.

Preferably, the drive wheels are toothed, and the fixation elements are at least partly realized as engagement elements that fix the drive wheels in the defined assembly position relative to one another by their engagement in the teeth. Through the engagement elements, which are preferably matched to the geometrical shape of the teeth, the teeth, and thus the drive wheels, can be fixed precisely in the preassembled position ready for operation. The engagement elements that engage in the teeth ensure that the drive wheels cannot rotate and thus can be installed in the provided position. Drive wheels having teeth are preferably used with chains or toothed belts as endless traction mechanisms; in this case, in addition to the transmission of the rotational movement the teeth can simultaneously be used for the positive positional fixing of the drive wheels in the preassembled tension mechanism drive. Preferably, the housing of the tensioning device has four fixation elements that fix two drive wheels in the assembled position relative to one another. Thus, preferably two fixation elements are provided per drive wheel in order to fix these wheels. By using these two fixation elements per wheel, the drive wheels can advantageously be fixed, and for this purpose the two fixation elements are preferably situated offset to one another so that a tilting or pivoting movement of the drive wheels out of the drive wheel plane can be counteracted.

The housing and the fixation elements are preferably realized in one piece. In addition, the housing of the tensioning device is preferably realized as an aluminum cast part. Through a corresponding manufacture of the housing as an aluminum cast part in which the fixation elements are provided, the various parts can be produced in one step. For example, the casting mold can already be fashioned such that the fixation elements are integrally formed so that they are already placed at their predetermined positions.

BRIEF DESCRIPTION OF THE DRAWINGS

In the following, the present invention is explained in more detail on the basis of a preferred exemplary embodiment.

DETAILED DESCRIPTION OF THE PREFERRED EMBODIMENTS

Figure 1:
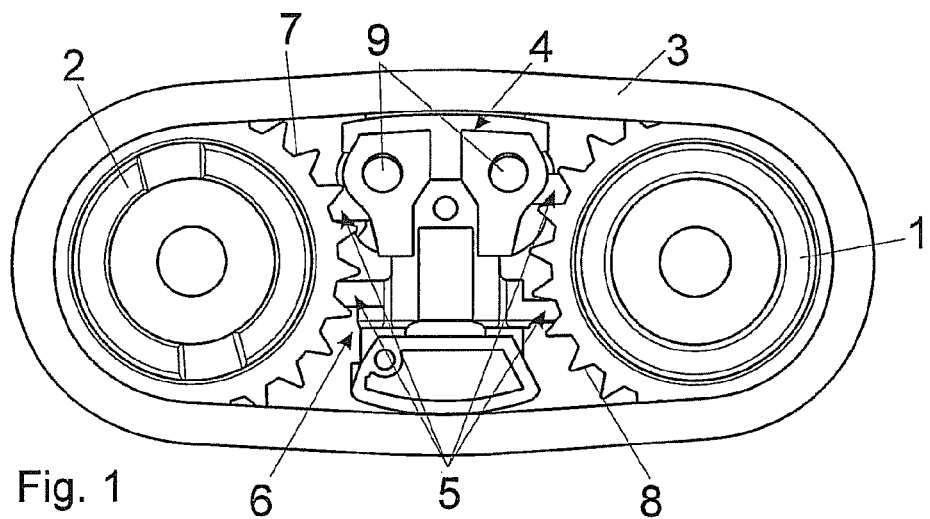
FIG. 1 shows a side view of a traction mechanism drive having two drive wheels and a tensioning device.
Figure 2:
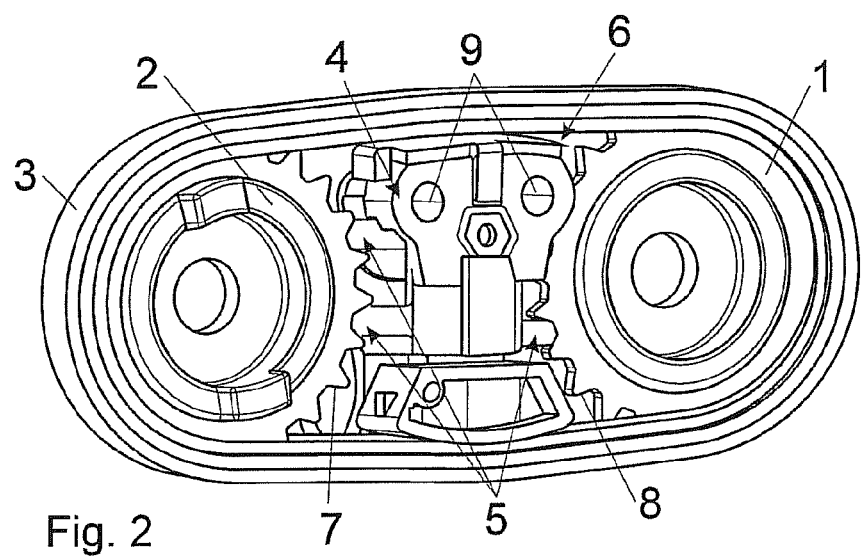
FIG. 2 shows an isometric view of a traction mechanism drive having two drive wheels and a tensioning device.

FIGS. 1 and 2 show a traction mechanism drive situated in a preassembled transport position having two drive wheels 1 and 2, each provided with toothing 7 and 8 and around which an endless traction mechanism 3 is radially externally wrapped. Drive wheels 1 and 2 are a drive wheel and a driven wheel, such that the rotational movement of the drive wheel can be transmitted via endless traction mechanism 3 to the driven wheel. As endless traction mechanism 3, for example chains or toothed belts are used that engage in teeth 7 and 8, and transmit the rotational movement with a positive fit. Alternatively, drive wheels 1, 2 without teeth are used, in which case endless traction mechanism 3 can then be formed by a non-toothed belt or a cable.

In addition, a tensioning device 6 having a housing 4 is provided that is situated on the inner sides of endless traction mechanism 3 and can include both a mechanical force storage device and also a pressure chamber that can be charged with a pressure medium.

The transport position is distinguished in that drive wheels 1, 2 are fixed in their relative position to one another, their distance from one another is defined, and a rotational movement is not possible. This preassembled transport position is achieved in that housing 4 of tensioning device 6 has four fixation elements 5 that engage in the teeth 7, 8 and thus prevent the rotational movement. Because endless traction device 3 is pre-tensioned, drive wheels 1, 2 are additionally laterally pressed against housing 4. In this way, drive wheels 1, 2 cannot unintentionally move away from housing 4, thus losing the fixing contact. In order to prevent drive wheels 1, 2 from pivoting out of the plane that they themselves span, or executing any other undesired movements, upper fixation elements 5 are situated so as to be offset relative to lower fixation elements 5 in two planes: for both drive wheels 1, 2, they are preferably situated both above and below mid-axis X of the tension mechanism drive, and also at an axial distance from one another. In addition, or alternatively, they can also have a width that is greater than the width of drive wheels 1, 2. This width, or this axial offset, has the result that drive wheels 1, 2 cannot execute a tilting or pivoting movement, but rather are fixed in the plane that they span (in FIG. 1, the image plane) by fixation elements 5.

Housing 4 has two cylindrical openings 9 that can for example be bored holes. Housing 4 is preferably realized as an aluminum cast part. In this case, cylindrical openings 9 can already be produced or provided in the context of the aluminum casting method, and do not have to be made subsequently in housing 4. During installation, openings 9 are used to connect tensioning device 6 to an internal combustion engine, for example using screws.

Due to the advantageous situation described above of fixation elements 5 on housing 4, the preassembled chain drive can be moved out of its transport or fixed position and installed in one step. Installation preferably takes place as follows:

In order to fasten the preassembled traction mechanism drive, this drive is pushed, with drive wheels 1 and 2 positionally fixed relative to one another by fixation element 5, onto the ends, protruding from the aggregate, of the shafts between which the rotational movement is to be transmitted, and is subsequently fastened using suitable fastening means. In addition, means are also provided for connecting tensioning device 6 to the internal combustion engine. For example, tensioning device 6 is pushed onto threaded rods and is subsequently screwed onto them. Because drive wheels 1 and 2 are positionally fixed relative to one another by tensioning device 6, or housing 4, with fixation elements 5, in particular the bores of drive wheels 1 and 2 are already in an orientation to one another that corresponds to the orientation of the ends of the shafts, so that the preassembled tension mechanism drive can be situated on the aggregate purely by executing a pushing movement onto the ends of the shafts, and can subsequently be fastened there.

During the fastening of tensioning device 6, for example by screwing it tight, tensioning device 6 is moved in the axial direction, standardly toward the internal combustion engine, so that fixation elements 5 also execute the same axial movement. Because fixation elements 5 are situated on housing 4 in such a way that an axial displacement of housing 4 during installation of tensioning device 6 causes a release of fixed drive wheels 1, 2, drive wheels 1, 2 are released by the screwing step and the fixing is released. The installation of tensioning device 6 correspondingly moves fixation elements 5 axially out of the plane in which they engage in drive wheels 1, 2. In contrast to known solutions, it is therefore not necessary to dismantle or remove any parts in order to release the transport or fixed position.

LIST OF REFERENCE CHARACTERS 1 drive wheel
2 drive wheel
3 endless traction mechanism
4 housing
5 fixation element
6 tensioning device
7 teeth
8 teeth 9 opening
10 midaxis

The invention claimed is:

1. A preassembled traction mechanism drive, comprising
at least two drive wheels around which an endless traction mechanism is wrapped, and
a tensioning device that has a housing and is supported on the internal side of the endless traction mechanism,
at least two fixation elements are provided on the housing that are fixedly connected to the housing and that fix the drive wheels, around which the endless traction mechanism are wrapped, in a defined assembly position at an operating distance from one another, wherein an axial displacement of the at least two fixation elements releases the fixed drive wheels.

2. The preassembled traction mechanism drive as recited in claim 1, wherein the fixation elements are located on the housing such that an axial displacement of the housing during installation of the tensioning device causes a release of the fixed drive wheels.

3. A preassembled traction mechanism drive, comprising
at least two drive wheels around which an endless traction mechanism is wrapped, and
a tensioning device that has a housing and is supported on the internal side of the endless traction mechanism,
at least two fixation elements are provided on the housing that are fixedly connected to the housing and that fix the drive wheels, around which the endless traction mechanism are wrapped, at an operating distance from one another, wherein the fixation elements are located on the housing such that during installation of the tensioning device the fixation elements are moved out of a plane spanned by the fixed drive wheels and thus release the drive wheels.

4. The preassembled traction mechanism drive as recited in claim 1, wherein the tensioning device is situated between the drive wheels, and at least two of the drive wheels are fixed relative to one another by simultaneous contact with the fixation elements of the tensioning device.

5. The preassembled traction mechanism drive as recited in claim 4, wherein the endless traction mechanism is pre-tensioned by the tensioning device, and the drive wheels are tensioned against the tensioning device by a tension force acting in the endless traction mechanism.

6. The preassembled traction mechanism drive as recited in claim 1, wherein the housing of the tensioning device has four of the fixation elements and there are two of the drive wheels, and the four fixation elements fix the two drive wheels in an assembly position relative to one another.

7. The preassembled traction mechanism drive as recited in claim 1, wherein the housing and the fixation elements are formed in one piece.

8. The preassembled traction mechanism drive as recited in claim 1, wherein the housing of the tensioning device is comprised of an aluminum cast part.

9. The preassembled traction mechanism drive as recited in claim 3, wherein an axial releasing movement of the housing with fixation elements, which movement releases the fixing of the drive wheels, is included in a movement executed by the tensioning device during installation.

10. A preassembled traction mechanism drive, comprising
at least two drive wheels around which an endless traction mechanism is wrapped, and
a tensioning device that has a housing and is supported on the internal side of the endless traction mechanism,
at least two fixation elements are provided on the housing that are fixedly connected to the housing and that fix the drive wheels, around which the endless traction mechanism are wrapped, at an operating distance from one another, wherein the drive wheels have teeth and the fixation elements are at least partly comprise engagement elements that fix the drive wheels in a defined assembly position relative to one another by engagement in the teeth.

* * * * *